United States Patent [19]

Eldin et al.

[11] 4,404,355

[45] Sep. 13, 1983

[54] HEAT CURABLE EPOXY RESIN COMPOSITIONS

[75] Inventors: Sameer H. Eldin, Birsfelden; Bruno Schreiber, Aesch, both of Switzerland

[73] Assignee: Ciba-Geigy Corporation, Ardsley, N.Y.

[21] Appl. No.: 305,829

[22] Filed: Sep. 28, 1981

[30] Foreign Application Priority Data

Oct. 8, 1980 [CH] Switzerland .................... 7509/80

[51] Int. Cl.$^3$ ............................................. C08G 59/68
[52] U.S. Cl. ........................................ 528/89; 525/504; 525/505; 525/506; 525/507; 528/90; 528/91; 528/92; 528/93; 528/361; 528/368; 528/408; 528/409; 528/412
[58] Field of Search .................. 528/89, 90, 91, 92, 528/361, 368, 408, 409, 412; 525/504, 505, 506, 507

[56] References Cited

U.S. PATENT DOCUMENTS

| | | | |
|---|---|---|---|
| 3,287,314 | 11/1966 | Van Vliet | 524/176 |
| 3,461,287 | 8/1969 | Rai | 524/176 X |
| 4,173,551 | 11/1979 | Crivello | 528/90 X |
| 4,238,587 | 12/1980 | Crivello | 528/92 X |
| 4,283,312 | 8/1981 | Crivello | 528/91 X |
| 4,342,673 | 8/1982 | Wolfrey | 528/92 X |

OTHER PUBLICATIONS

J. V. Crivello et al., Macromolecules, 10, 1307 (1977).
J. V. Crivello et al., J. Polymer Sci., 17, 977, 1047 (1979).
CA, 82, 45237s (1975).
CA, 84, 61400m (1976).
G. R. Chalkley et al., J. Chem. Soc. (C), 1970, 682.

*Primary Examiner*—Earl A. Nielsen
*Attorney, Agent, or Firm*—Luther A. R. Hall

[57] ABSTRACT

The invention relates to heat curable epoxy resin compositions consisting of an epoxy resin containing, on average, more than one epoxide group per molecule, an aromatic onium salt as catalyst, a copper complex compound as co-catalyst, and a light stabilizer. These compositions are less sensitive to UV irradiation and have a good shelf life at room temperature as well as a good high temperature reactivity.

9 Claims, No Drawings

HEAT CURABLE EPOXY RESIN COMPOSITIONS

The present invention relates to heat curable epoxy resin compositions which contain catalytic amounts of an onium salt, a copper complex salt as co-catalyst and a light stabiliser.

It is known that epoxy resins can be cationically polymerised in the presence of onium salts by UV irradiation. However, such curable epoxy resin compositions can only be cured at relatively high temperatures by the application of heat alone.

In U.S. Pat. No. 4,173,551 the proposal is therefore made to incorporate a co-catalyst, such as a copper salt and/or an organic acid, in the curable epoxy resin compositions which contain an onium salt. As copper salts there are used, for example, the copper halides or copper salts of organic acids. While these epoxy resin compositions are very reactive at elevated temperature, they have the drawback of having low storage stability. Owing to the photosensitivity of the onium salt, the epoxy resin compositions have to be stored in the dark; but even then they have a considerably limited pot life. They are therefore mainly suitable for use as moulding compositions; but they are less suitable for use e.g. as impregnating resins or as formulations for surface protection.

It has now been found that these drawbacks can be avoided by using organic copper complex compounds instead of simple copper salts. Epoxy resin compositions which contain an onium salt, a copper complex compound as co-catalyst and a light stabiliser not only have a significantly better storage life, but are also more resistant to UV irradiation and have good high-temperature reactivity. The epoxy resin compositions of this invention thus have an excellent ratio of low-temperature reactivity to high-temperature reactivity for their utility as casting and impregnating resins, insulating resins, laminating resins, and as formulations for surface protection.

Accordingly, the present invention provides heat curable epoxy resin compositions which contain
 (a) an epoxy compound or an epoxy resin containing on average more than one epoxide group per molecule,
 (b) a catalytic amount of an aromatic onium salt,
 (c) a catalytic amount of an organic copper compound, wherein the copper is complexed, as co-catalyst, and
 (d) a light stabiliser.

The epoxy resin mixtures of the invention preferably contain
 (a) an aromatic, aliphatic or cycloaliphatic epoxy compound containing at least two epoxide groups per molecule,
 (b) an aromatic onium salt of the formula I

$$[Ar_mQ]^+ \cdot [MX_n]^- \qquad (I),$$

wherein each Ar is an aromatic radical, Q is iodine, sulfur or selenium, M is a metal or metalloid, X is halogen, m is 2 or 3 and greater by one than the valency of Q, and n is 4, 5 or 6 and greater by one than the valency of M,
 (c) an organic copper complex compound, and
 (d) an ultra-violet absorber as light-stabiliser.

The epoxy resins contained in the compositions of the invention can belong to all classes of epoxy resins. It is preferred to use aromatic, aliphatic or cycloaliphatic epoxy compounds, for example the diglycidyl or polyglycidyl ethers of polyhydric phenols, such as resorcinol, bis-(p-hydroxyphenyl)methane, 2,2-bis-(p-hydroxyphenyl)-propane (Diomethane), 2,2-bis-(4'-hydroxy-3',5'-dibromophenyl)propane, 1,1,2,2-tetrakis-(p-hydroxyphenyl)ethane, or of condensation products of phenols with formaldehyde obtained under acid conditions, such as phenol novolaks and cresol novolaks, the di- or polyglycidyl ethers of polyhydric aliphatic alcohols such as 1,4-butanediol, or of polyalkylene glycols such as polypropylene glycols; the di- or polyglycidyl ethers of cycloaliphatic polyols, such as 2,2-bis-(4-hydroxycyclohexyl)propane, the di- or poly-(β-methylglycidyl) ethers of the polyhydric alcohols specified above or of polyhydric phenols; the polyglycidyl esters of polyvalent carboxylic acids such as phthalic acid, terephthalic acid, $\Delta^4$-tetrahydrophthalic acid and hexahydrophthalic acid; and the alicyclic diepoxides such as limonene dioxide, dicyclopentadiene dioxide, ethylene glycol bis-(3,4-epoxytetrahydrocyclopentadien-8-yl)glycidyl ether; and also compounds containing two epoxycyclohexyl radicals, such as diethylene glycol bis-(3,4-epoxycyclohexanecarboxylate), bis-3,4-(epoxycyclohexylmethyl)succinate, 3',4'-epoxy-6'-methylcyclohexylmethyl-3,4-epoxy-6-methylcyclohexanecarboxylate and 3',4'-epoxyhexahydrobenzal-3,4-epoxycyclohexane-1,1-dimethanol.

Further suitable epoxy compounds are the N-glycidyl derivatives of amines, amides and heterocyclic nitrogen bases such as N,N-diglycidyl aniline, N,N-diglycidyl toluidine, N,N,N',N'-tetraglycidyl-bis(p-aminophenyl)methane, triglycidylisocyanurate, N,N'-diglycidylethylene urea, N,N'-diglycidyl-5,5-dimethylhydantoin, N,N'-diglycidyl-5-isopropylhydantoin, N,N'-diglycidyl-5,5-dimethyl-6-isopropyl-5,6-dihydantoin, N,N'-diglycidyl-5,5-dimethyl-6-isopropyl-5,6-dihydrouracil.

The epoxy resin compositions of the invention can also contain advanced epoxy resins. Such epoxy resins are known and can be prepared e.g. by reacting a hardening agent for epoxy resins, for example a dicarboxylic acid anhydride or a diamine, with an equivalent excess of an epoxy resin. The compositions of the invention can also contain a number of the epoxy resins specified above.

The epoxy resin compositions of the invention preferably contain a di- or polyglycidyl ether or ester, in particular a di- or polyglycidyl ether of a diphenol or polyphenol.

The onium salts contained in the compositions of the invention, for example aryldiazonium salts, sulfonium salts, aryloxysulfoxonium salts, selenonium or telluronium salts, phosphonium salts or halonium salts, e.g. in particular the iodonium salts, are also known compounds. The production and use of e.g. iodonium, sulfonium and selenonium salts are described in "Macromolecules", Vol. 10, No. 6 (1977), pp. 1307–1310, and in the Journal of Polymer Science, Vol. 17, pp. 977–999 and pp. 1047–1057 (1979). Aromatic diazonium salts and halonium salts and the use thereof as initiators for the cationic polymerisation of epoxy resins are described e.g. in German Offenlegungsschrift specification No. 2 315 500 or 2 518 639. Aryloxysulfoxonium salts are described in the Journal of the Chemical Society (C), 1970, pp. 682–686. The curable epoxy resin compositions preferably contain, as component (b), an iodonium salt, a sulfonium salt and, if desired, a selenonium salt.

In particular, component (b) of the curable epoxy resin compositions of the invention consists of an onium salt of the formula I, wherein each Ar independently is phenyl, naphthyl, or phenyl which is substituted by $C_1$–$C_4$alkyl, phenyl, phenoxy, halogen, nitro or $C_1$–$C_4$alkoxy, or two symbols Ar together are a divalent radical of the formula II

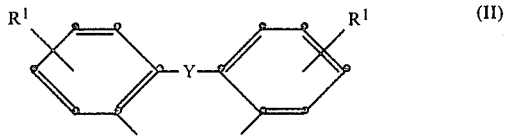

wherein Y is a direct bond, —O—, —S— or —$CH_2$—, and each $R^1$ is hydrogen, $C_1$–$C_4$alkyl, halogen, nitro or $C_1$–$C_4$alkoxy, M is a metal or metalloid atom selected from the series consisting of B, P, As, Sb, Sn, Bi and Fe, X is fluorine or chlorine, and m and n are as defined for formula I.

Examples of the anion $[MX_n]^-$ in formula I are: $BF_4^-$, $PF_6^-$, $AsF_6^-$, $SbCl_6^-$, $BiCl_6^-$, $SbF_6^-$, $SnCl_5^-$ or $FeCl_4^-$. The onium salt of the formula I preferably contains one of the anions $BF_4^-$, $PF_6^-$, $AsF_6^-$, $SbCl_6^-$ or $SbF_6^-$.

The copper complexes employed as co-catalysts are known and are described e.g. in "Gmelin", Band Kupfer, Part B (fascicle 4) on pp. 1538–1594.

Suitable copper complexes which can be incorporated in the compositions of the invention are those in which the copper(I) or copper(II) cation is complexed with ligands which form inner complexes. For example, they are copper complexes in which the complex forming ligand is an aldehyde, ketone, carboxamide, an aliphatic aminomonocarboxylic acid such as glycine or a glycine derivative, or an aminopolycarboxylic acid such as aminodicarboxylic acid.

In the curable compositions of the invention it is preferred to use copper complexes with ketones, e.g. aliphatic mono- or diketones, acetylacetone homologs or hydroxycarboxylic acids or ketonic acids. Particularly suitable copper complexes are those in which the complex forming ligand is an acetylacetone homolog such as benzoylacetone or acetoacetic ester. In particular, the copper complex with acetylacetone is used in the compositions of the invention.

The light stabilisers which can be incorporated in the curable compositions of the invention must be thermally stable under the processing conditions of the compositions, as well as chemically inert to the components.

The light stabilisers incorporated in the compositions of the invention are preferably UV absorbers, i.e. compounds which have a pronounced capacity for absorbing ultraviolet radiation. Examples of suitable UV absorbers are: 2-hydroxybenzophenones, e.g. 2,4-dihydroxybenzophenone, 2-hydroxy-4-methoxybenzophenone, 4-dodecyloxy-2-hydroxybenzophenone, 2,4-dibenzoylresorcinol and 5-chloro-2-hydroxybenzophenone, substituted 2-(2'-hydroxyphenyl)benztriazoles, e.g. 2-(2-hydroxy-5'-methylphenyl)benztriazole, 2-(3'-tert-butyl-2'-hydroxyphenyl)benztriazole, 2-(3',5'-di-tert-butyl-2'-hydroxyphenyl)-5-chlorobenztriazole and 2-[2-hydroxy-3,5-di[α,α-dimethylbenzyl)phenyl]-2H-benztriazole, arylsubstituted acrylates, e.g. ethyl-2-cyano-3,3-diphenylacrylate or 2-ethylhexyl-2-cyano-3,3-diphenylacrylate, salicylates, e.g. phenylsalicylate, p-tert-butylphenylsalicylate, or p-tert-octylphenylsalicylate.

Other light stabilisers, such as non-UV absorbers, can also be incorporated in the compositions of the invention. These light stabilisers are the known nickel chelates, nickel complexes and nickel salts of aromatic compounds.

The aforementioned light stabilisers are known compounds and are described in Kirk-Othmer (Encyclopedia of Chemical Technology), Vol. 21, pp. 115–121, in German Auslegeschrift 1 815 610, and in European patent application 0006564.

As mentioned at the outset, catalytic amounts of onium salts and copper complexes are employed. It is preferred to use 0.75 to 2.5 parts, most preferably 1.3 to 2 parts, of an onium salt, based on 100 parts of epoxy compound.

The amount of copper complex salt added is advantageously based on the amount of onium salt present in the curable mixture. In general, the amount of copper complex salt incorporated in the curable compositions is 0.01 to 10 parts, preferably 0.1 to 1 part and, most preferably, 0.1 to 0.3 part, based on 1 part of onium salt.

The amount of light stabiliser incorporated in the curable epoxy resin compositions will depend on the extension of the pot life which such incorporation is intended to achieve. In general, not more than 2 parts of light stabiliser, based on 100 parts of epoxy resin, are incorporated in the curable epoxy resin compositions of this invention. It is preferred to use 0.05 to 1 part, most preferably 0.25 to 0.75 part, of light stabiliser, based on 100 parts of epoxy resin.

If desired, still further co-catalysts, such as organic acids or carboxylic acid anhydrides, can be incorporated in the curable epoxy resin compositions.

The epoxy resin compositions of this invention which contain an aromatic onium salt and a copper complex, can be quickly converted into the cured state be heating to above 100° C. preferably above 120° C., and are suitable for the production of moulded materials, coatings or bonds.

The invention is further illustrated by the following Example.

EXAMPLE 1 AND COMPARATIVE TESTS A TO C

Four different formulations are prepared by mixing 100 g of a bisphenol A diglycidyl ether having an epoxide content of 5.3 eq./kg (epoxide I) with 1.65 g of diphenyliodonium hexafluoroarsenate (DPIA) and 0.239 g of copper acetylacetonate (CuAA) or a corresponding amount of an organic copper salt.

| | Composition of the formulations: | | | |
|---|---|---|---|---|
| | Example 1 | Comparison A | Comparison B | Comparison C |
| (a) | 100 g of epoxide I | 100 g of epoxide I | 100 g of epoxide I | 100 g of epoxide I |
| (b) | 1.65 g of DPIA | 1.65 g of DPIA | 1.65 g of DPIA | 1.65 g of DPIA |
| (c) | 0.239 g of CuAA | 0.182 g of Cu—acetate | 0.279 g of Cu—benzoate | 0.576 g of Cu—stearate |

The amount of respective copper compound is chosen such that each formulation contains 0.057% by weight of copper.

Each of the four formulations is prepared in the same manner: Compounds (a), (b) and (c) are mixed together and passed 3 times over a three-roll mill. The DPIA goes into solution and the copper compounds remain finely dispersed in suspension.

The latency of the formulations was determined by measuring the gel time in thin layer on a hot plate and by observing the increase in viscosity, measured by the ball drop method of Höppler, at 40° C. As the DPIA is a photosensitiser, the Höppler viscosity tubes were protected against light by aluminium foil between the measurements.

| Example | X<br>Gel time at 120° C.<br>[minutes] | Y<br>Doubling of viscosity at 40° C. [hours] | Latency factor<br>= Y/X |
|---------|---------|---------|---------|
| 1 | 9.3 | 281 | 1813 |
| A | 3.3 | 22.5 | 409 |
| B | 2.4 | 11 | 275 |
| C | 4.9 | 29 | 355 |

It follows from the results that the formulation of Example 1 has, by comparison, a somewhat longer gel time at 120° C. and a pot life up to 40° C. which is longer by at least the factor of 9.7. The result is a substantially better latency, which is reflected in the very much higher latency factor.

Films of the formulations of Example 1 and Comparative Tests A to C are applied to aluminum sheets in a thickness of 150μ with a film applicator. These films are irradiated with a FLUOTEST-FORTE quartz lamp (Art. No. 5261, available from Hanau) at a distance of 18.9 cm. The experiments are carried out with the exclusion of outside light. The time until the films are non-tacky is measured.

| Formulation of: | Non-tacky after (repeated test): |
|---|---|
| Example 1 | 3h/3h 10' |
| Comparison A | 25'55"/27' |
| Comparison B | 39'10"/41' |
| Comparison C | 29'35"/30' |

This test shows the low light sensitivity of the composition of Example 1, i.e. it shows that such a system has a substantially longer shelf life under normal conditions, viz. daylight.

By additionally incorporating 0.5% by weight of 2-[2-hydroxy-3,5-di-(α,α-dimethylbenzyl)phenyl]-2H-benzotriazole as light stabiliser in the composition of Example 1, and irradiating the films under the same conditions, the time in which the films become non-tacky can be prolonged to 7.6 hours.

What is claimed is:
1. A heat curable epoxy resin composition which contains
   (a) an epoxy compound or an epoxy resin containing on average more than one epoxide group per molecule,
   (b) a catalytic amount of an aromatic onium salt,
   (c) a catalytic amount of an organic copper compound, wherein the copper is complexed, as co-catalyst, and
   (d) from 0.05 to 2 parts, based on 100 parts of epoxy resin, of a light stabilizer selected from the group consisting of the 2-hydroxybenzophenones, the 2-hydroxyphenylbenzotriazoles, 2,4-dibenzoylresorcinol, the arylsubstituted acrylates and the salicylates.

2. A composition according to claim 1 which contains
   (a) an aromatic, aliphatic or cycloaliphatic epoxy compound containing at least two epoxide groups per molecule,
   (b) an aromatic onium salt of formula I $$[Ar_mQ]+\cdot[MX_n]- \qquad (I),$$

wherein each Ar is an aromatic radical, Q is iodine, sulfur or selenium, M is a metal or metalloid, X is halogen, m is 2 or 3 and greater by one than the valency of Q, and n is 4, 5 or 6 and greater by one than the valency of M,
   (c) an organic copper complex compound, and
   (d) from 0.05 to 2 parts, based on 100 parts of epoxy resin,
of a light stabilizer selected from the group consisting of the 2-hydroxybenzophenones, the 2-hydroxyphenylbenzotriazoles, 2,4-dibenzoylresorcinol, the arylsubstituted acrylates and the salicylates.

3. A composition according to claim 1, wherein component (a) is a di- or polyglycidyl ether or a di- or polyglycidyl ester.

4. A composition according to claim 1, wherein component (a) is a di- or polyglycidyl ether of a diphenol or polyphenol.

5. A composition according to claim 1, wherein component (b) is an iodonium salt or a sulfonium salt.

6. A composition according to claim 2, wherein component (b) is an onium salt of the formula I, wherein each Ar independently is phenyl, naphthyl, or phenyl which is substituted by $C_1$-$C_4$alkyl, phenyl, phenoxy, halogen, nitro or $C_1$-$C_4$alkoxy, or two symbols Ar together are a divalent radical of the formula II

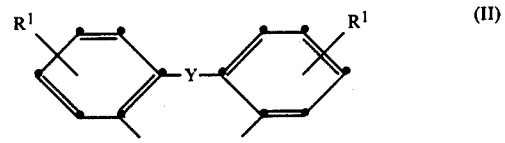

wherein Y is a direct bond, —O—, —S— or —CH$_2$—, and each $R^1$ is hydrogen, $C_1$—$C_4$alkyl, halogen, nitro or $C_1$-$C_4$alkoxy, M is a metal or metalloid atom selected from the series consisting of B, P, As, Sb, Sn, Bi and Fe, X is fluorine or chlorine, and m and n are as defined for formula I.

7. A composition according to claim 2, wherein component (b) is a compound of the formula I, in which the anion [MX$_n$]- is one of the anions BF$_4$-, PF$_6$-, AsF$_6$-, SbCl$_6$- or SbF$_6$-.

8. A composition according to claim 1, wherein component (c) is a copper complex in which the complex forming ligand is acetylacetone or a homolog thereof.

9. A composition according to claim 1 wherein component (d) is 2-[2-hydroxy-3,5-di(α,α-dimethylbenzyl)phenyl]-2H-benzotriazole.

* * * * *